Aug. 30, 1927.
G. BUELNA
SPRINKLER
Filed March 6, 1926
1,640,751
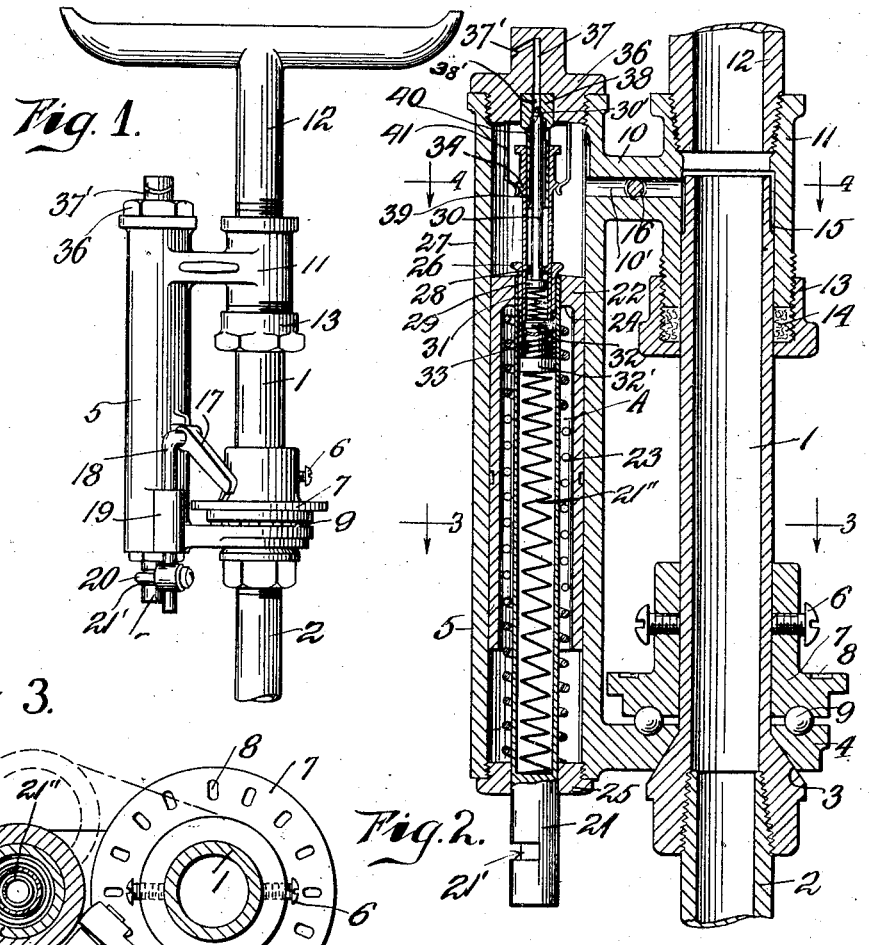
INVENTOR.
Guadalupe Buelna
BY
ATTORNEY Patented Aug. 30, 1927.

1,640,751

UNITED STATES PATENT OFFICE.

GUADALUPE BUELNA, OF SANTA BARBARA, CALIFORNIA.

SPRINKLER.

Application filed March 6, 1926. Serial No. 92,669. REISSUED

This invention relates to a device for sprinkling fluids and it has particular reference to an irrigation sprinkler, the object of the invention being to provide a device by which portions of a definite area may be successively irrigated a determinate length of time, and in which the irrigation of successive portions of an area may be automatically controlled by the water passing through the sprinkler.

Other objects will appear from the following specification in connection with the accompanying drawing which illustrates a preferred form of embodiment of the invention and in which Fig. 1 is a front view showing my invention attached to a source of water supply.

Fig. 2 is a sectional elevation, showing piston while moving downwardly.

Fig. 3 is a plan section on line 3—3 Fig. 2.

Fig. 4 is a plan section on line 4—4 Fig 2 and

Fig. 5 is a fragmentary detail, showing the normal and in dotted lines, the operative position of the sprinkler operating means.

The invention relates to that class of rotary sprinklers in which the rotation thereof is interrupted by periods of rest alternating with periods of movement, the latter being very short, but the former being relatively long as hereinafter explained. Thereby successive portions of an area may be irrigated for a prolonged time, and after such prolonged irrigation the sprinkler arms are automatically moved so that the next adjoining portion of the area will be irrigated. In this wise a greater extent of area may be wetted, and a more thorough irrigation may be effected.

Broadly considered, the invention consists of a pipe connected with a source of water supply, a sprinkler for dispersing the water, and a means operable by water pressure to move the sprinkler periodically relative to the water supply pipe.

Specifically my invention is shown as comprising a stand pipe 1, threadedly associated with a water supply pipe 2 and formed with a conical seat 3 for a bearing 4, which is integrally united with and extended laterally from the bottom of a cylindrical chamber 5, which is rotatable relatively to and about said stand pipe 1, as hereinafter more particularly detailed.

Fastened to the outside of said stand pipe 1 by set screws 6 or other desirable means, is an annular disk 7, provided in the upper face with indentations 8, and constituting substantially a ratchet. This disk 7 is spaced from the bearing 4 and between said disk and bearing is interposed an anti-friction means, as balls 9, for obvious purposes. Extending in a plane parallel, and integrally united, with said cylindrical chamber 5 by a lateral bored extension 10 formed on and near the top of said chamber 5, is a fitting 11, interiorly threaded in the upper end thereof for the accommodation of a sprinkling member 12. The upper end of the stand pipe 1 is extended into the lower portion of said fitting 11, which has a smooth bore, and the lower end of said fitting 11 is exteriorly threaded for receiving a nut 13 by which a suitable packing material 14 is arranged to be compressed about the stand pipe 1 to prevent leakage. The exterior diameter of the upper end of said stand pipe 1 is slightly reduced as shown at 15, to permit a small quantity of the water passing through the pipe 1 to the sprinkler member to escape into and through the bore 10' of the lateral extension 10 and to pass into the cylindrical chamber 5, the quantity that is to pass being controlled by a valve 16, provided on said extension 10. As will be understood from the foregoing description, the cylindrical chamber 5, with the connected fitting 11, sprinkler member 12 and the laterally extending bearing 4, are rotatable relatively to the stationary stand pipe 1, and the ratchet 7 mounted thereon. This cylindrical chamber 5 is arranged to be moved circularly about said stand pipe 1 with an intermittent motion by the means described as follows.

Co-operating with said ratchet 7 is a pawl 17 pivotally carried on one end of a shaft 18 which extends through and is guided by a boss 19 on the cylindrical chamber 5. On the other end of said shaft 18 is fastened by any suitable means, a finger 20 which is arranged to engage in a groove 21', provided therefor, in the end of an operating rod 21, which, as shown in Fig. 2, is connected at the top with a piston 22. For the greater part of its length, the operating rod 21 is hollow, and one end thereof extends entirely through the piston 22. The rod 21 is diametrically smaller than the piston 22, thereby providing a space A for a helical spring 23. This spring is disposed within the piston 22, and between the upper end 24 thereof and a cap or plug 25 which closes the bottom of the cylindrical chamber 5 and through which plug the operating rod 21 projects. In the upper open end of the operating rod 21, which is connected with the piston 22, as stated, is inserted, by friction fit, a bushing 26, forming a guide for a tubular valve housing 27, having an interior shoulder 28 against which is held normally pressed the head 29 of a valve stem 30 by a spring 31, which in turn is held within the housing 27 by a screw 32, the head 32' of which, being diametrically greater than the tubular valve housing 27, forms a seat for a spring 33, which is coiled about said housing between the bottom of said bushing 26 and said head 32'. Within said operating rod 21 is disposed a spring 21" which is in engagement with the head 32' on the end of the tubular housing 27, and which serves to move said tubular valve housing 27, upwardly during the upward movement of the piston 22, and to force the valve into its seat. The said tubular housing 27 is formed with lateral projections 34 near the upper end thereof for the purposes appearing presently. The upper end of the cylindrical chamber 5 is threaded for the accommodation of a closing cap 36, which is provided with a central passageway 37 and is formed with a spray nozzle 37' through which water is exhausted as explained later.

Inset in the bottom of said cap 36 is a valve seat 38 for the valve 30' on the end of the valve stem 30. This valve seat 38 is formed with a tubular extension 39 which acts as a guide for the valve stem 30 and which, as seen in Fig. 2 extends for a short distance into the upper end of the valve housing 27, for which said tubular extension 39 also forms a guide. The tubular extension 39 of the valve seat 38 is provided with ports 40 by which communication is established between the upper part of the cylindrical chamber 5 and the passageway 37 in the cap, when the valve 30' is unseated, to discharge the water in the upper part of said cylindrical chamber. The seat 38 is provided with a passageway 38' which coincides with the passageway 37 in the cap 36, for obvious reasons.

The cap 36 is provided on the underside thereof with depending resilient, spaced, prehensile members 41, which co-operate with the projections 34 on the tubular valve housing 27 to hold said housing normally inoperative for a determinable length of time during the movement of the piston 22, as explained in the description of the operation of the device.

Assuming the parts of the sprinkler to be in the positions shown in Fig. 2 and that water is passing through the stand pipe 1 and discharging from the sprinkler member 12, it will be seen that the operating rod 21 is projected beyond the bottom of the cylindrical chamber 5. Movement of the operating rod occurs when the piston 22 to which the rod is connected is impelled downwardly under the head of water accumulating in the top of the cylindrical chamber 5, the water for this purpose entering said chamber 5 through the port 10' in the extension 10, and the quantity of water so passing being regulated by the valve 16. During the descent of the piston 22 and operating rod 21, the tubular valve housing 27 is also moved downwardly by the bushing 26, which is tightly fitted in the operating rod 21, and which engages the spring 33 around said tubular housing 27. The spring 33, by the downward movement of the operating rod 21, is compressed against the head 32' of the screw in the end of the tubular valve housing 27, the movement of the tubular valve housing 27, is prevented by the prehensile spring fingers 41 until the tension of these fingers against the lateral projection 34 is overcome by the continued downward movement of the piston 22 and the pull of the bushing 26 against the compression spring 33. When the tension of the resilient spring members 41 is finally overcome, the valve housing 27 is suddenly pulled downwardly by the still descending piston and operating rod, and the valve 30' unseated, at the same time uncovering the ports 40 in the tubular extension of the seat 38 and permitting the water in the top of the cylindrical chamber to escape through the nozzle 37' on the cap 36. When the tubular valve housing 27 has slipped engagement with the spring fingers 41, the piston 22 and the operating rod 21 will have reached the limit of their downward movment. During such downward movement of the operating rod 21, the pawl 17, connected therewith through the medium of the shaft 18, and in engagement with one of the indentations 8 in the disk 7, will move the cylindrical chamber 5, the sprinkler member 12 and appurtenant parts, relative to the stand pipe 1, the distance of one indentation. So soon as the valve 30' has been unseated, the spring 23 will force the piston 22 upwardly, and the spring 21", also carried upwardly by the operating rod 21 and with the piston, will exert its compressive force against the head 32' of the tubular valve housing 27, and force the projections 34 thereon between and beyond the spring fingers 41, thereby resetting the valve housing and causing the valve 30' to be seated. When the piston 22 and operating rod 21 have been returned to their normally inoperative position, the pawl 17 will be moved to the next indentation of the disk 7. In this wise the cylindrical chamber 5, with its sprinkling member 12, will be moved relatively to the stand pipe 1 continuously with an intermittent motion, the speed of such motion being determined by the quantity of water permitted to pass into the cylindrical chamber 5 from the stand pipe 1.

The period of rest of the chamber 5 is determined by the length of time required for the water to escape from the chamber through the passageway 37 and the nozzle 37'.

What I claim, is:

1. A sprinkling device comprising a stand pipe, a ratchet secured thereto, a cylindrical chamber mounted on said stand pipe to rotate relatively thereto, a water sprinkling member connected with said chamber to move therewith, and having communication with said stand pipe, means to control the passage of water from said standpipe to said chamber, a piston operable by water pressure within said chamber, means associated with said piston and engaging said ratchet continuously to rotate said chamber relatively to said stand pipe with an intermittent motion, and means to exhaust the water from said chamber after each intermittent motion thereof.

2. A sprinkling device comprising a stand pipe provided with a ratchet, a cylindrical chamber mounted on said stand pipe to rotate relatively thereto, a water sprinkling member connected with said chamber to move therewith and having communication with said stand pipe, means to control the passage of water from said stand pipe to said chamber, a piston within said chamber operable by the water pressure therein, means associated with said piston and engaging said ratchet to move said chamber during the operation of said piston, means to exhaust the pressure water from said chamber, and means to return the piston to inoperative position.

3. A sprinkling device comprising a stand pipe provided with a ratchet, a chamber mounted on said stand pipe to rotate relatively thereto, said chamber communicating with stand pipe and having a water exhaust, a valve to control said exhaust, a piston within said chamber operable by water pressure therein, means connected with said piston to engage said ratchet and move said chamber with an intermittent motion, means operable by said piston to unseat said valve to cause the pressure water in said chamber to exhaust, and means to return said piston to normal position.

4. A sprinkling device comprising a stand pipe provided with a ratchet, a chamber mounted on said stand pipe to rotate relatively thereto, said chamber having communication with said stand pipe, and provided with an exhaust, a valve to control said exhaust, a pawl arranged for engagement with said ratchet, a piston in said chamber to which said pawl is connected, said piston operable by water pressure in one direction to cause said pawl to move said chamber intermittently, means associated with said piston to unseat said valve when said chamber has been moved, means to move said piston in another direction, and means to seat said valve.

5. A sprinkling device comprising a stand pipe provided with a ratchet, a cylindrical chamber mounted on said stand pipe to rotate relatively thereto, a water sprinkling member connected with said chamber to move therewith and having communication with said stand pipe, means to control the passage of water from said stand pipe to said chamber, said chamber having a water exhaust therein, a valve to control said water exhaust, a pawl in engagement with said ratchet, and means to operate said pawl to move said chamber relatively to said stand pipe with an intermittent motion, comprising a piston in said cylinder operable in one direction by water pressure and in another direction by spring pressure and means to operate said exhaust valve relative to the movement of said chamber.

6. A sprinkling device comprising a water conveying pipe, a chamber associated with said pipe and rotatable relatively thereto, said chamber having communication with said pipe, a reciprocating piston within said chamber and operable by a portion of the water passing through said pipe, mutually engaging means on said pipe and piston to move said chamber automatically with an intermittent motion, and means to exhaust the water from said chamber upon the return stroke of the piston.

7. A sprinkling device comprising a stand pipe, a chamber associated with said stand pipe and rotatable relatively thereto, said chamber having communication with said stand pipe, a sprinkler member connected with said chamber to move therewith, a piston within said chamber and operable in one direction by water pressure, a connection between said stand pipe and piston whereby upon the movement of said piston by water pressure said chamber is automatically rotated intermittently, means to exhaust the water from said chamber, and means to move said piston in another direction.

8. A sprinkling device comprising a stationary water conducting pipe, a chamber associated with said pipe to have movement relatively thereto, said chamber communicating with said pipe to receive a portion of the water flowing through said pipe, means to control the quantity of water passing into said chamber, a valve within said chamber to confine the water therein, a piston within said chamber and operable in one direction by water pressure, mutually engaging means on said pipe and piston whereby said chamber is moved automatically with an intermittent motion, means controllable by said piston to unseat said valve and cause the water within said chamber to exhaust therefrom, and means to move said piston in another direction and simultaneously operate said valve.

9. A sprinkling device comprising a stand pipe, a chamber mounted on said stand pipe to rotate relatively thereto, said chamber communicating with said stand pipe and having a water exhaust, a valve to control said exhaust, a piston within said chamber operable by water pressure therein, mutually engaging means on said piston and stand pipe to move said chamber with an intermittent motion, means to unseat said valve to cause the pressure water in said chamber to exhaust, and means to return said piston to normal position.

10. A sprinkling device comprising a pipe, a chamber associated and communicating with said pipe and rotatable relatively thereto, a sprinkler member connected with said chamber to move therewith and having communication therewith, said chamber having an exhaust opening, a piston within said chamber and operable by a portion of the water passing through said pipe, connections between said piston and pipe whereby said chamber is moved relatively to said pipe, and means operable by the movement of said piston to open and close said exhaust opening.

In testimony whereof I have set my hand.

GUADALUPE BUELNA.